United States Patent [19]

Sunami

[11] Patent Number: 4,983,948
[45] Date of Patent: Jan. 8, 1991

[54] CAR THEFT PROOFING SYSTEM

[76] Inventor: Sadakatsu Sunami, 8-3, Asukanokita 3-chome, Ikoma-shi, Nara-ken, Japan

[21] Appl. No.: 368,723

[22] Filed: Jun. 21, 1989

[51] Int. Cl.⁵ .............................................. B60R 25/10
[52] U.S. Cl. .................... 340/426; 340/539;
340/542; 307/10.2; 200/61.64; 70/416;
70/DIG. 49; 70/dIG. 51; 180/173; 180/287
[58] Field of Search ........... 340/426, 541, 542, 825.31,
340/825.32, 539; 307/9.1, 10.1, 10.2, 10.3;
200/61.64; 70/416-419, 357, 379 R, DIG. 2,
DIG. 21, DIG. 38, DIG. 49, DIG. 51;
180/173, 287

[56] References Cited

U.S. PATENT DOCUMENTS 3,936,673  2/1976  Kelly et al. ................... 307/10.3
4,628,300 12/1986  Amato ............................ 340/542
4,855,710  8/1989  Kikuchi et al. .

Primary Examiner—Donnie L. Crosland
Attorney, Agent, or Firm—Edwin E. Greigg

[57] ABSTRACT

A car theft proofing system includes a sensor attached to or mounted adjacent a cylinder door lock for detecting insertion into the door lock of a door key or other article, an alarm device for giving an alarm, an alarm drive device for driving the alarm device, a control unit for causing the alarm device to give the alarm in response to signals received from the sensor and the alarm drive device, and a radio transmitter for transmitting a radio wave upon insertion of the article. The alarm drive device includes a portable remote control transmitter and a receiver disposed on a car body. The remote control transmitter includes an abnormality alarm for transmitting a theft signal in response to the radio wave transmitted from the radio transmitter.

31 Claims, 9 Drawing Sheets

CAR THEFT PROOFING SYSTEM

BACKGROUND OF THE INVENTION (1) Field of the Invention

The present invention relates to car theft proofing systems, and more particularly to a car theft proofing system acting as a safeguard against car theft in which a thief unlocks a car door by inserting a plate, bar or other articles through a space between a window pane and a door panel into a door lock mechanism, or by inserting an imitation key, wire or other articles into a cylinder door lock.

(2) Cross-Reference to Related Application

This application constitutes an improvement related to that disclosed in application Ser. No. 240,670 filed in the U.S. Patent and Trademark Office on Sept. 6, 1988.

(3) Description of Prior Art

Conventionally, when leaving a car, the car owner (driver), to avoid theft, stops the engine, pulls out the engine key, shuts the windows and locks the door with a door key, or interlocks the door and shut it with the outside door grip turned up to lock the door.

The car door has a vertically movable window pane, and a space is formed between the window pane and the door panel. This space is sealed against rain by means of moquette, rubber seal or the like.

Recently the doors of parked cars are often forced open and equipment such as car stereos and air-conditioners are stolen by thieves. In such cases, a door is unlocked by pushing and flexing the window pane inwardly or deforming the rubber seal and pressing the window pane for access to the space between the window pane and the door panel. Through this space the thief inserts a thin plate, bar or other picklock instrument, and directly manipulates a door lock mechanism.

Car theft cases are taking place in an increasing number recently wherein not only the interior equipment but buts cars themselves are stolen and used in secondary, atrocious crimes such as robbery and kidnaping, or to cause traffic accidents.

On the other hand, thieves often unlock the doors of parked cars by inserting a wire, imitation key or other article into the cylinder door lock, and steal the interior equipment or the cars themselves for use in atrocious crimes.

SUMMARY OF THE INVENTION

Having regard to the problem in safeguarding cars against theft, the object of the present invention is to provide a car theft proofing system which gives an alarm before a thief forces open a door, and notifies the car owner of the abnormality by a radio wave when the door is forced open, thereby to effectively prevent car theft. This car theft proofing system allows the car owner or authorized person to turn off the alarm drive means and/or a sensor in the cylinder lock before opening the car door, so that the alarm will not sound with insertion into the cylinder lock of a door key made for that particular lock.

In order to achieve the above object, a car theft proofing system according to one aspect of the present invention comprises an elongate sensor mounted in a space between a car door and a window pane and upwardly of a door lock mechanism for detecting insertion into the space of a plate, bar or other article, an alarm device for giving an alarm, alarm drive means to output a signal for driving the alarm device, control means to cause the alarm device to give the alarm in response to a signal received from the elongate sensor and the signal from the alarm drive means, and a radio transmitter for detecting insertion of the article and transmitting a radio wave, wherein the alarm drive means includes a portable remote control transmitter and a receiver disposed on a car body, the remote control transmitter including abnormality alarm means for transmitting a theft signal in response to the radio wave transmitted from the radio transmitter.

The characterizing feature of the invention lies in that the main part of the system includes a radio transmitter for detecting insertion of a foreign article and transmitting a radio wave, and that the alarm drive means includes a portable remote control transmitter and a receiver disposed on a car body, the remote control transmitter including abnormality alarm means for transmitting a theft signal in response to the radio wave transmitted from the radio transmitter.

Upon noting the abnormality, the car owner hurries to his or her car or reports to the police for catching the thief. Thus the system is effective for prevention of such a crime.

The elongate sensor used in this invention is not limited to a particular type of sensor as long as it may be mounted in a space between the window pane and door panel of a car door and can detect a foreign matter such as a thin plate or a bar inserted through the space between the window pane and door panel. The elongate sensor may comprise an image sensor or a line sensor. The line sensor is preferred since it is inexpensive and can be mounted in a narrow space. The line sensor may comprise a CTD such as a CCD or a BBD.

Further, the elongate sensor may comprise a photosensor including a light emitting element and a light receiving element, an ultrasonic or radio wave emitter-receiver combination, a combination of a light, ultrasonic or radio wave emitter and a sensing element for detecting disturbances of the light, ultrasonic or radio waves, or a pressure sensitive element in band form.

In addition, the elongate sensor may comprise the hinge type with a contact element pivotable into contact with a sensing element to turn on the sensor.

In other words, the elongate sensor employed in the present invention may comprise a sensor including a ceramic oscillator utilizing ultrasonic wave or a composite oscillator, a proximity sensor utilizing magnetism, a pressure sensitive switch, or a radio wave sensor. These sensors and switches may be the transmission type or the reflection type, and may be formed of a single element or a plurality of elements arranged at selected intervals.

The alarm device used in the present invention is not limited to a particular type as long as it is driven by the control means in response to the signal output from the sensor and the signal output from the alarm drive means. For example, the alarm device may comprise a buzzer for producing an extraordinary warning sound, a car horn, a signal lamp for emitting red light, or their combination.

The alarm drive means is not limited to a particularly type as long as it transmits the signal for driving the alarm device. The alarm drive device may comprise a combination of a remote control transmitter and a receiver, or a light emitter and a light receiver, or may be directly plugged into a connector provided on the car body to transmit a signal for driving the alarm device.

The control means is not limited to a particular construction as long as it outputs the alarm signal to the alarm device in response to the output signals from the sensor and the alarm drive device when a person other than the car owner or authorized person (namely a thief) inserts a foreign matter from the window pane, or a door key or other article into the cylinder lock of the door. Specifically, the control means may comprise the CPU of a computer, that is a CPU storing a program for outputting an alarm signal to the alarm device upon receipt of the output signals from the alarm drive device and the sensor, a device including an AND circuit and the like of logic elements for outputting an alarm signal to the alarm device in response to the output signals from the alarm drive device and the sensor, or a device including a series circuit of a first switch connected to the sensor and a second switch connected to the receiver for outputting an alarm signal to the alarm device in response to the output signals from the sensor and the receiver.

With the first aspect of the invention, when the car owner leaves the car, he or she sets the alarm device to be operable by the alarm drive means. When in this state a thief inserts a thin plate into the space between the window pane and the door panel, the elongate sensor detects the thin plate and is turned on. As a result, the control means causes the alarm device to give an alarm in response to the signals from the alarm drive means and the elongate sensor.

The elongate sensor is mounted in the space between the door panel and the window pane and upwardly of the door lock mechanism, namely adjacent a position of entry of a picklock instrument. Accordingly, the sensor detects the picklock instrument before it reaches the door lock mechanism, which is effective to prevent car theft with increased reliability.

The car owner is notified of the abnormality by the radio wave transmitted from the radio transmitter. Then, the car owner hurries to his or her car or reports to the police for catching the thief. Thus the system is effective for prevention of such a crime.

On the other hand, the car owner or authorized person may cancel the operable state of the alarm device by means of the alarm drive means and/or the sensor before opening the car door. Consequently, in an emergency when the owner or authorized person does not have the car key in hand, the alarm will not sound with insertion of a thin plate into the space between the window pane and the door panel for undoing the door lock mechanism.

According to another aspect of the present invention, a car theft proofing system comprises an elongate sensor mounted in a space between a car door and a window pane and upwardly of a door lock mechanism for detecting insertion into the space of a plate, bar or other article, a sensor attached to or mounted adjacent a cylinder door lock for detecting insertion into the door lock of a door key or other article, an alarm device for giving an alarm, alarm drive means to output a signal for driving the alarm device, control means to cause the alarm device to give the alarm in response to a signal received from at least one of the sensors and the signal from the alarm drive means, and a radio transmitter for detecting insertion of the article and transmitting a radio wave, wherein the alarm drive means includes a portable remote control transmitter and a receiver disposed on a car body, the remote control transmitter including abnormality alarm means for transmitting a theft signal in response to the radio wave transmitted from the radio transmitter.

The above system includes an additional sensor provided for the door cylinder lock for detecting an abnormality when a door key or other article is inserted into the cylinder lock. This feature further promotes the car theft prevention.

In the above construction, car theft is prevented by the sensor mounted in or adjacent the cylinder lock for detecting insertion of a plate, bar or other article into the cylinder lock, and the elongate sensor is mounted in the space between the window pane and the door panel.

The sensor mounted in the cylinder lock is not limited to any particular type as long as it can detect the door key or other article inserted into the cylinder lock. Such a sensor may comprise a photosensor including a light emitting element and a light receiving element, or a limit switch or proximity switch operable upon contact with the door key or other articles.

Further, the sensor mounted adjacent the cylinder look is not limited to a particular type as long as it can detect the door key or other article inserted into the cylinder lock. Such a sensor may comprise a photosensor including a light emitting element and a light receiving element, a combination of an ultrasonic or radio wave transmitter and an associated receiver, or a combination of an ultrasonic or radio wave transmitter and a sensing element for detecting disturbances of the ultrasonic or radio waves.

In other words, the sensor employed herein may comprise a sensor including a ceramic oscillator utilizing ultrasonic wave or a composite oscillator, a proximity sensor utilizing magnetism, a pressure sensitive switch, or a radio wave sensor. These sensors and switches may be the transmission type or the reflection type, and may be formed of a single element or a plurality of elements.

The characterizing feature of the invention lies in that the system includes a radio transmitter for detecting insertion of a foreign article and transmitting a radio wave, and that the alarm drive means includes a portable remote control transmitter and a receiver disposed on a car body, the remote control transmitter including abnormality alarm means for transmitting a theft signal in response to the radio wave transmitted from the radio transmitter.

Upon noting the abnormality, the car owner hurries to his or her car or reports to the police for catching the thief. Thus the system is effective for prevention of such a crime.

When leaving the car, the car owner sets the alarm device to be operable by the alarm drive means. When in this state a thief inserts an imitation key or other article into the cylinder lock or a thin plate through the space between the window pane and the door panel, the elongate sensor mounted in the space between the window pane and the door panel or the sensor attached to or mounted adjacent the cylinder lock is turned on. As a result, the control means causes the alarm device to give an alarm in response to the signals from the alarm drive means and one of the sensors.

The abnormality is notified to the car owner by the radio wave transmitted from the radio transmitter. Then, the car owner hurries to his or her car or reports to the police for catching the thief. Thus the system is effective for prevention of such a crime.

On the other hand, the car owner or authorized person may cancel the operable state of the alarm device by operating the alarm drive means and/or the sensor before opening the car door. Consequently, the alarm will not sound with insertion of the door key or other article into the cylinder lock.

Other advantages of the present invention will be apparent from the following description to be had with reference to the drawings.

BRIEF DESCRIPTION OF THE DRAWINGS

The drawings illustrate car theft proofing systems according to the present invention, in which.

DETAILED DESCRIPTION OF THE PREFERRED EMBODIMENTS

Embodiments of the present invention will particularly be described hereinafter, but the invention is not limited to such embodiments.

Figure 1:
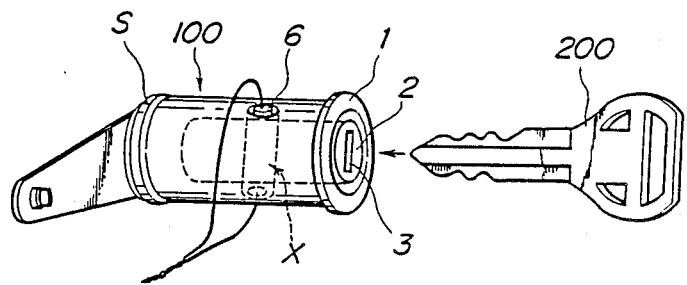
FIG. 1 is a perspective view of a cylinder lock for a car door.
Figure 2:
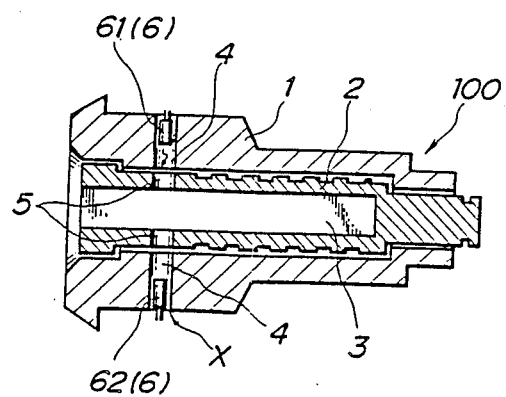
FIG. 2 is a sectional view of the cylinder lock.

FIG. 1 is a perspective view of a cylinder door lock of a car theft proofing system according to one embodiment of the present invention. FIG. 2 is a schematic sectional view of the cylinder door lock.

In FIGS. 1 and 2, the cylinder door lock 100 comprises a hollow outer cylinder 1 and an inner cylinder 2 rotatably mounted in the outer cylinder 1. The inner cylinder 2 has a keyhole 3 for removably receiving a door key 200.

The outer cylinder 1 includes oppositely disposed bores 4, and the inner cylinder 2 includes bores 5. These bores 4 and 5 communicate with one another to define a through bore X when the door key 200 is removed from the inner cylinder 2.

More particularly, the inner cylinder 2 is constantly maintained in a predetermined position relative to the outer cylinder 1 under the urging force of a spring, not shown, unless the inner cylinder 2 is rotated by the door key 200. When the inner cylinder 2 is in the predetermined position, the bores 4 and 5 are aligned to define the through bore X.

The bores 4 of the outer cylinder 1 accommodate a sensor 6 for detecting insertion into the door lock 100 of the door key 200 or other articles. This sensor 6 will be described in detail hereinafter.

Figure 3:
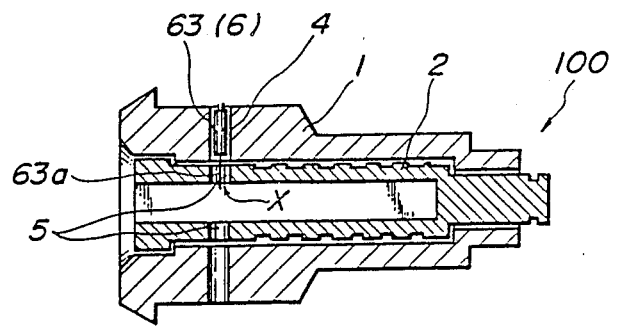
FIG. 3 is a sectional view of a modified cylinder lock.

The sensor 6 comprises, for example, a photosensor including a light emitting element and a light receiving element, a limit switch operable upon contact with the door key 200 or other articles, or a proximity switch.

Where the sensor 6 comprises a photosensor, the photosensor 6 includes a light emitting diode 61 and a phototransistor 62. The light emitting diode 61 is mounted in one of the bores 4 defined in the outer cylinder 1, and the phototransistor 62 in the other bore 4. Consequently, when the through bore X is formed, light emitted from the diode 61 passes through the through bore X and enters the phototransistor 62.

Where the sensor 6 comprises a limit switch, the switch 63, as shown in FIG. 3, is mounted in one of the bores 4 of the outer cylinder 1 with a contact 63a thereof extending into one of the bores 5 of the inner cylinder 2. The contact 63a is contactable by the door key 200 or other article inserted through the keyhole 3, whereby the sensor 6 is turned on to provide an output signal.

Figure 4:
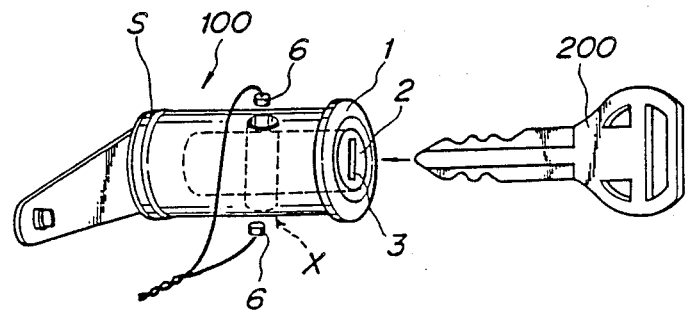
FIG. 4 is a perspective view of a cylinder lock with a sensor mounted adjacent thereto.
Figure 5:
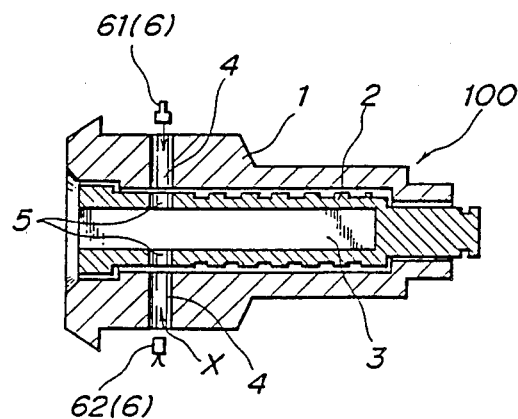
FIG. 5 is a sectional view of the cylinder lock of FIG. 4.
Figure 6:
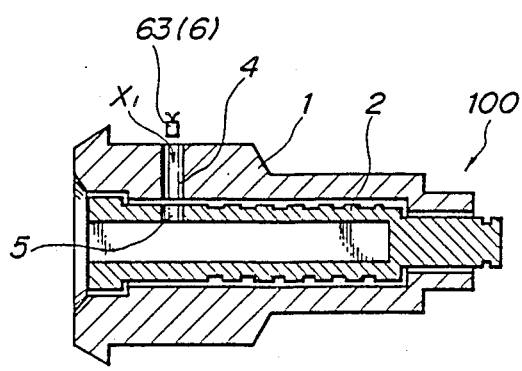
FIG. 6 is a sectional view of a further example of cylinder lock.

In the foregoing examples, the sensor 6 is mounted in the cylinder door lock 100. Alternatively, the sensor 6 may be mounted adjacent the door lock 100 as shown in FIGS. 4 through 6. Thus the sensor 6 is mounted adjacent or outwardly of the outer cylinder 1 for detecting insertion into the door lock 100 of the door key 200 or other article. This sensor 6 will particularly be described now.

The sensor 6 comprises a photosensor including a light emitting element and a light receiving element in this example, but may comprise a transmitter-receiver combination of ultrasonic or radio waves, for example.

Where the sensor 6 comprises a photosensor, the sensor includes a light emitting diode 61 and a phototransistor 62. As shown in FIGS. 4 and 5, the light emitting diode 61 is mounted outwardly of one end of the through bore X, and the phototransistor 62 outwardly of the other end thereof for sensing the output signal of the light emitting diode 61. Consequently, when the through bore X is formed, light emitted from the diode 61 passes through the through bore X and enters the phototransistor 62.

FIG. 6 shows another construction wherein the door lock 100 defines a bore X1 extending from a peripheral position into communication with the keyhole 3, and a sensor 6 (63) is mounted outwardly of the bore X1. The sensor 6 (63) includes an output element (not shown) for emitting an output signal into the bore X1, and a sensing element (not shown) for detecting the output signal reflected by the door key 200 or other article inserted into the door lock 100. When the door key 200 or other article is inserted through the keyhole 3, the output signal from the output element is reflected by the door key 200 or other article, and the reflected signal is detected by the sensing element whereby the sensor 6 (63) is turned on to provide a signal. Preferably, the sensing element comprises the type that detects disturbances of the reflected signal, so that the signal reflected by the door key 200 or other article may readily be distinguished from the signal reflected by an inside wall of the door lock 100 to eliminate possibility of operational error.

The sensor 6 employed in this example is not limited to a particular type as long as disturbances of the output signal reflected by the door key 200 or other article are detected. For example, the sensor 6 may comprise a light, ultrasonic or radio wave emitting element (output element), and a sensing element for detecting disturbances of the light, ultrasonic or radio waves.

Figure 7:
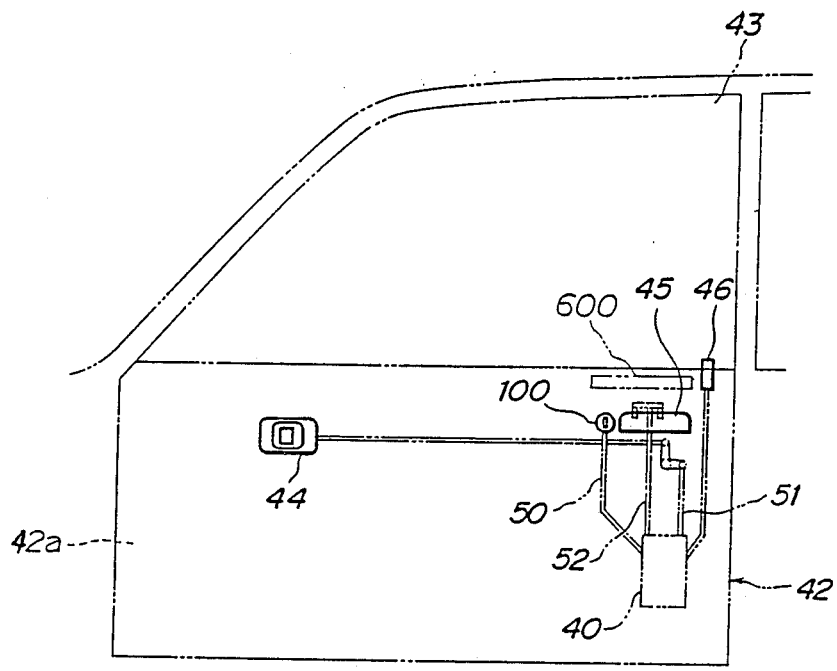
FIG. 7 is a schematic view of a car door having a theft proofing system according to the present invention.

FIG. 7 is a schematic view of an embodiment of the present invention in which a car door 42 includes an elongate sensor 600 mounted in a space between a window pane 43 and a door panel 42a and upwardly of a door lock mechanism 40 for detecting a wire, bar or other such article inserted into that space. FIG. 7 shows the door lock mechanism 40 and associated elements.

In FIG. 7, the door lock mechanism 40 is mounted at a lower inside position of the car door 42, and the elongate sensor 600 is mounted in the space between the window pane 43 and the door panel 42a upwardly of the door lock mechanism 40.

The cylinder lock 100 is mounted above the door lock mechanism 40 and is exposed outwardly. Number 44 indicates an inside door knob, number 45 an outside door knob, and number 46 a window-side lock knob.

The elongate sensor 600 is mounted upwardly of the door lock mechanism 40 as noted above. More specifically, the elongate sensor 600 is provided at a position of entry or passage, and an area surrounding such a position, of a thin plate 59 or the like used by a thief for manipulating the door lock mechanism 40 in an attempt to unlock the door.

The elongate sensor 600 may comprise an image sensor or a line sensor. The line sensor is preferred since it is inexpensive and can be mounted in a narrow space. The line sensor may comprise a CTD such as a CCD or a BBD.

Figure 11:
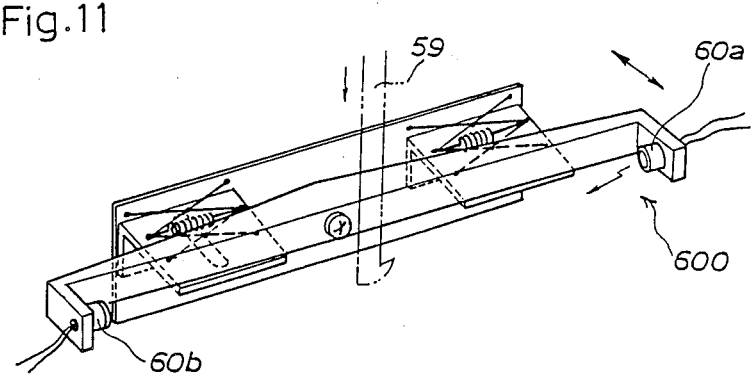
FIGS. 11 through 13 are perspective views of elongate sensors suited for use in the present invention.
Figure 12:
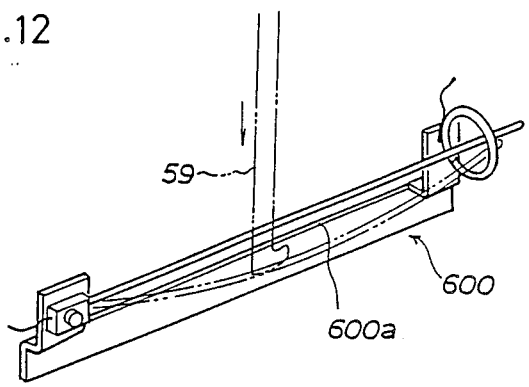

Further, the elongate sensor 600 may comprise a photosensor including a light emitting element 60a and a light receiving element 60b as shown in FIG. 11, an ultrasonic or radio wave emitter-receiver combination, a combination of a light, ultrasonic or radio wave emitter and a sensing element for detecting disturbances of the light, ultrasonic or radio waves, or a pressure sensitive element in band form. In addition, as shown in FIG. 12, the sensor 600 may include a contact element 600a with an end fixed to a negative electrode and the other end loosely fitted in a positive electrode in ring form. When a thin plate 59 contacts the contact element 600a, the other end contacts the positive electrode in ring form, thereby becoming electrified to transmit a signal.

Figure 13:
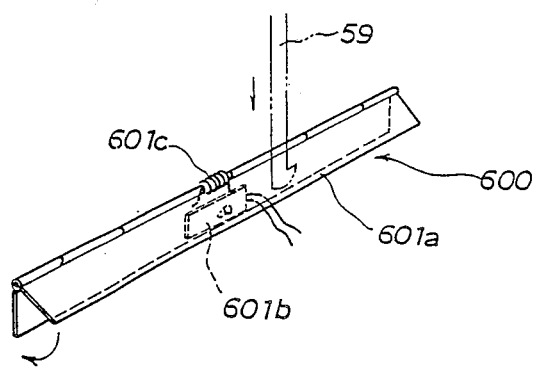

As shown in FIG. 13, the elongate sensor 600 may comprise the hinge type with a contact element 601 pivotable into contact with a sensing element 601b to turn on the sensor 600.

In FIG. 13, reference 601c indicates a spring for urging the contact element 601a outwardly. Reference 59 indicates a thin plate.

In other words, the elongate sensor 600 employed in the present invention may comprise a sensor including a ceramic oscillator utilizing ultrasonic wave or a composite oscillator, a proximity sensor utilizing magnetism, a pressure sensitive switch, or a radio wave sensor. These sensors and switches may be the transmission type or the reflection type, and may be formed of a single element or a plurality of elements arranged at selected intervals.

Figure 8:
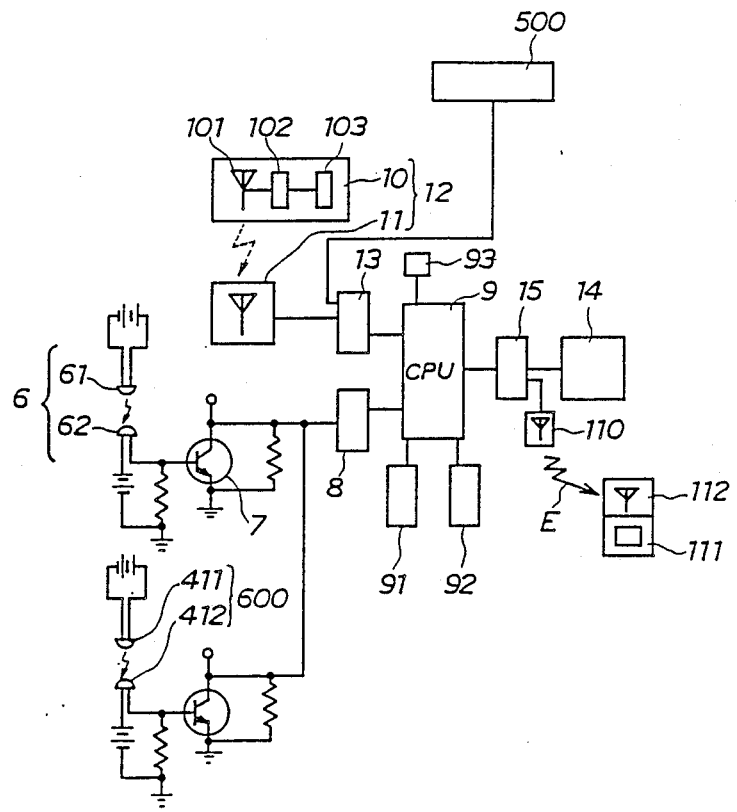
FIG. 8 is a block diagram of the theft proofing system.

FIG. 8 is a block diagram of a car theft proofing system according to the present invention.

The phototransistor 62 of the sensor 6 is connected to the base of another transistor 7 which gives an output through an I/O interface 8 to the CPU of a computer which is one example of control unit 9. The elongate sensor 600 has a phototransistor 412 which likewise is connected through the I/O interface 8 to the CPU 9.

An alarm drive device 12 acts as means to provide a signal for driving an alarm 14 to be described later and, as shown in FIG. 8, includes a remote control transmitter 10 and a receiver 11. The remote control transmitter 10 transmits radio waves with a frequency allotted to each car. This frequency may be shared to a certain extent by other cars as long as there is no possibility of interference (for example, interference may be avoided by regional allotment). The transmitter 10 includes an antenna 101, a transmitting unit 102, and a control unit 103 for controlling them.

The receiver 11 acts as means to receive the radio waves transmitted from the remote control transmitter 10, and is installed on the car. The receiver 11 is connected through an I/O interface 13 to the CPU 9.

The alarm drive device 12 need not necessarily comprise the radio wave transmitting remote control type but may be the light emitting remote control type. Alternatively, the alarm drive device 12 may be directly plugged into a connector provided on a car body, for example, to transmit a drive signal to the computer.

In this case, the drive signal may be prevented from being generated when the car owner or other authorized person plugs the alarm drive device 12 into the connector a second time. Further, the drive signal may be transmitted to and stored in the computer by plugging the alarm drive device 12 into the connector provided on the car body, the alarm being turned off by remote control for the owner or other authorized person to open the door.

The alarm 14 may comprise a buzzer for producing an extraordinary warning sound, a car horn, a signal lamp for emitting red light, or their combination. The alarm 14 is connected through an I/O interface 15 to the CPU 9.

A ROM 91 and a RAM 92 are connected to the CPU 9. The ROM 91 stores a program for causing the CPU 9 to output an alarm signal to the alarm 14 in response to the signals transmitted from the receiver 11 and the sensor 6. The RAM 92 is used for reading and writing data for the operation of CPU 9.

Number 93 indicates a set lamp for indicating that the system has been set. Software is provided for turning on this lamp when the system is set.

A radio transmitter 110 is connected to the I/O interface 15 for transmitting a radio wave E in response to the signal for driving the alarm 14. The remote control transmitter 10 includes an abnormality alarm device 111 for transmitting a theft signal in response to the radio wave E transmitted from the radio transmitter 110.

Number 112 indicates a radio receiver included in the remote control transmitter which receives the radio wave E for the alarm device 111 to transmit the theft signal.

When the car owner notes the abnormality by the buzzer or pilot lamp, he may hurry to his car and catch a thief or report to the police. This is very effective to prevent such a crime.

Figure 9:
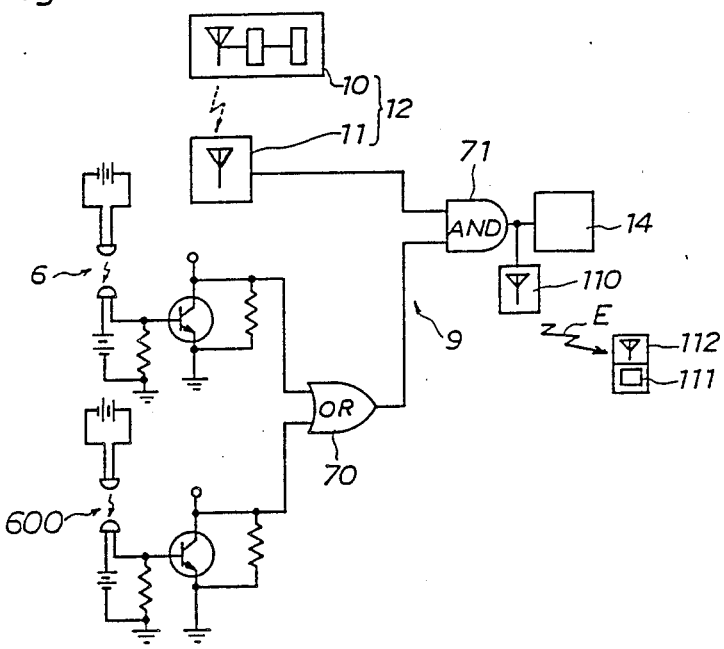
FIG. 9 is a block diagram of a modified car theft proofing system.

FIG. 9 is a block diagram of another embodiment of the present invention.

In FIG. 9, the control unit 9 includes an OR circuit 70 and an AND circuit 71 of logic elements. The OR circuit 70 receives the outputs of the photosensor 6 and the photosensor (elongate sensor) 600. The AND circuit 71 receives the output of the receiver 11 and an output signal of the OR circuit 70, and in response to these signals outputs a drive signal to the alarm 14.

A radio transmitter 110 is connected between the control unit 9 and the alarm 14 for transmitting a radio wave E in response to the signal for driving the alarm 14. The remote control transmitter 10 includes an abnormality alarm device 111 for transmitting a theft signal in response to the radio wave E transmitted from the radio transmitter 110.

Number 112 indicates a radio receiver included in the remote control transmitter which receives the radio wave E for the alarm device 111 to transmit the theft signal.

Figure 10:
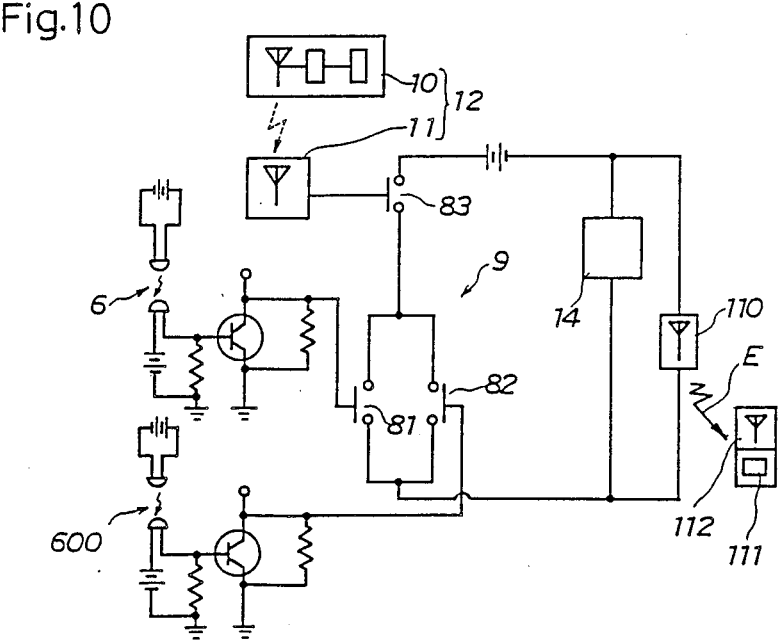
FIG. 10 is a block diagram of another car theft proofing system according to the present invention.

FIG. 10 is a block diagram of a further embodiment of the present invention.

In FIG. 10, the control unit 9 includes a first switch 81 and a second switch 82 in parallel connection, and a third switch 83 connected in series thereto. The first switch 81 is connected to the sensor 6, the second switch 82 to the elongate sensor 600, and the third switch 83 to the receiver 11. In this case too, the control unit 9 receives the signals from the sensor 6, elongate sensor 600 and receiver 11, and outputs a drive signal to the alarm 14 only when at least one of the sensors 6 and 600 is turned on and the receiver 11 transmits the signal.

The above series circuit includes a radio transmitter 110 connected parallel to the alarm 14 for transmitting a radio wave E in response to the signal for driving the alarm 14. The remote control transmitter 10 includes an abnormality alarm device 111 for transmitting a theft signal in response to the radio wave E transmitted from the radio transmitter 110.

Number 112 indicates a radio receiver included in the remote control transmitter which receives the radio wave E for the alarm device 111 to transmit the theft signal.

An operation of the foregoing embodiments where the sensor 6 comprises a photosensor will particularly be described next.

When the car owner leaves the car, he or she shuts the window, locks the door, and operates the remote control transmitter 10 to transmit the signal. This signal is received by the receiver 11 and input to the CPU (control unit) 9.

Assume that a thief approaches the car in this state, and attempts to open the car door by inserting a thin plate, bar, imitation key or the like into the cylinder door lock 100. When the door lock 100 is turned by the article inserted therein, the through bore X is broken and the light from the sensor 6 is interrupted or the reflected signal from the through bore X changes. As a result, the sensor detects entry of the picklock instrument. The turn-on signal of the sensor 6 is input through the I/O interface 8 to the CPU 9.

The thief may try to undo the lock mechanism 40 by inserting the thin plate 59 through the space between the window pane 43 and the door panel 42a. With insertion of the thin plate 59, the light of the elongate sensor 600 is interrupted and the turn-on signal is output. The turn-on signal of the elongate sensor 600 is input through the I/O interface 8 to the CPU 9.

In one of the above states, the CPU 9 outputs the alarm signal to the alarm 14 in response to the signal from the receiver 11 and the signal from the sensor 6 or the elongate sensor 600. Thus an alarm buzzer is given before the thief opens the door by means of a picklock instrument, whereby the car is safeguarded against theft. The period for alarm sounding may be preset to the CPU 9, or the alarm may be allowed to continue until the CPU (control unit) 9 is turned off.

The I/O interface 15 includes the radio transmitter 110 for transmitting a radio wave E in response to the signal for driving the alarm 14. The remote control transmitter 10 includes the abnormality alarm device 111 for transmitting a theft signal in response to the radio wave E transmitted from the radio transmitter 110. Thus, when the car owner notes the abnormality by the buzzer of pilot lamp, he may hurry to his car and catch a thief or report to the police. This is very effective to prevent such a crime.

On the other hand, when the car owner or authorized person intends to open the car door with the proper door key, he or she cancels the alarm drive signal by means of the remote control transmitter 10, for example. Then the alarm will not sound with insertion into the door lock 100 of the door key since the signal is not input from the receiver 11 though the sensor 6 which gives the turn-on signal.

As does the CPU 9, the OR circuit 70 and AND circuit 71 in the embodiment of FIG. 9, and the series circuit 81–83 in the embodiment of FIG. 10 confirm input of the signals from the receiver 11 and from the sensor 6 or elongate sensor 600, and output the alarm signal to the alarm 14.

The I/O interface 15 includes the radio transmitter 110 for transmitting a radio wave E in response to the signal for driving the alarm 14. The remote control transmitter 10 includes the abnormality alarm device 111 for transmitting a theft signal in response to the radio wave E transmitted from the radio transmitter 110. Thus, when the car owner notes the abnormality by the buzzer or pilot lamp, he may hurry to his car and catch a thief or report to the police. This is very effective to prevent such a crime.

Thus, according to the present invention, before the car door is opened by a thief, the sensor 6 detects entry of the door key 200 or other article and sounds the alarm. The car owner or authorized person is able to insert the door key through the keyhole 3 and undo the door lock without sounding the alarm by turning off the alarm drive device and/or the sensor beforehand.

In the present invention, the left signal from the abnormality alarm device 111 of the remote control transmitter 10 is given by a buzzer or flashing of the lamp. The construction is therefore simple and effective for notifying the abnormality to the car owner.

Figure 14:
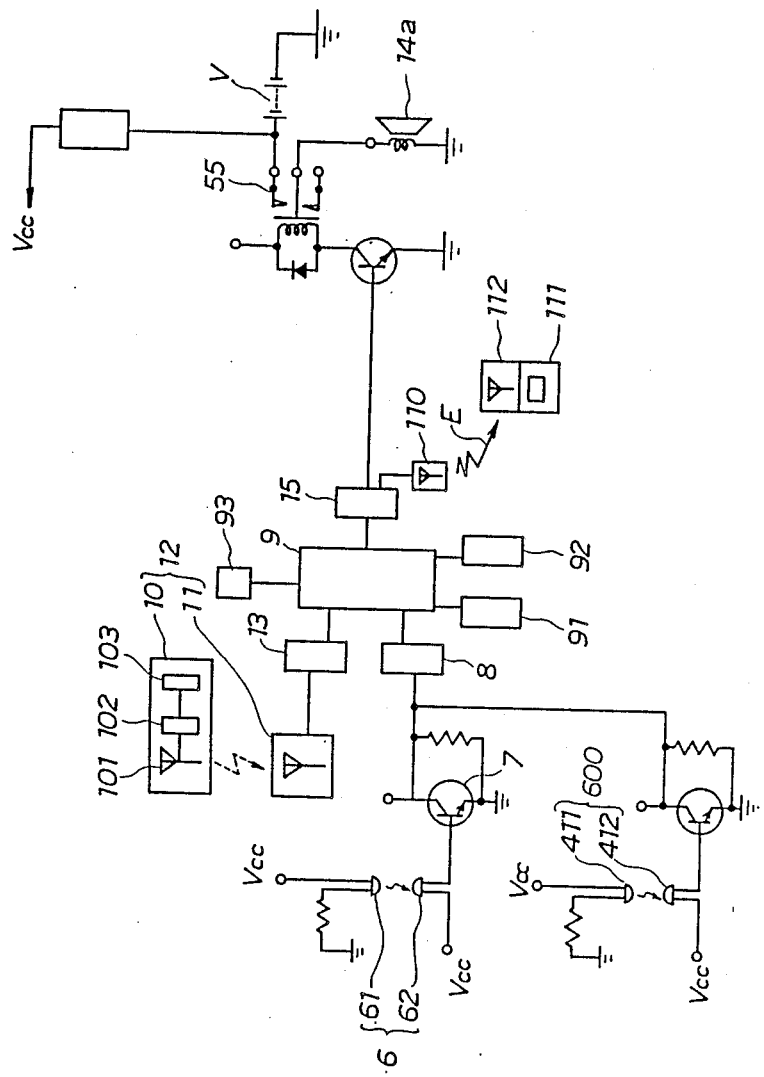
FIGS. 14 through 16 are block diagrams of other embodiments of the present invention, respectively.

As shown in FIG. 14, the battery mounted in the car body may be used as a system power source $V_{cc}$. This realizes a simple system, and greatly facilitates its provision in the car body.

Figure 15:
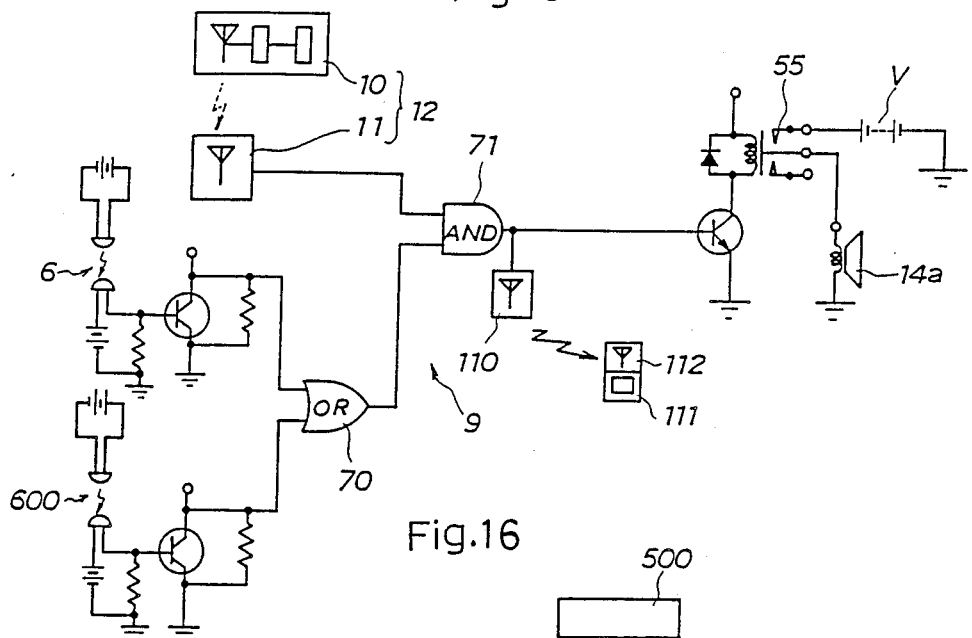

As shown in FIG. 15, the car battery may be used as an alarm driving power source for the system in the car body, and a reserve battery may be used for driving the other circuits. Then the load is reduced for the car battery, and the use of the car battery as the alarm driving power source V allows the alarm to operate reliably.

Number 55 in FIG. 15 indicates a relay for supplying power to the buzzer 14a when a thief opens the lock.

The present invention sets a driving period to the alarm 14 to avoid a long operation of the alarm 14. This is effective to reduce noise as well as the load for the alarm driving power source.

The remote control transmitter 10 may include a device for forcibly turning off the alarm 14. Then a long alarm operation may be avoided to reduce noise and the load for the alarm driving power source when the car owner has operated the alarm 14 in error or after a thief is caught.

The system may be set to the car body by the remote control transmitter according to the present invention.

This advantageously enables the car owner to readily set the system from outside the car.

Figure 16:
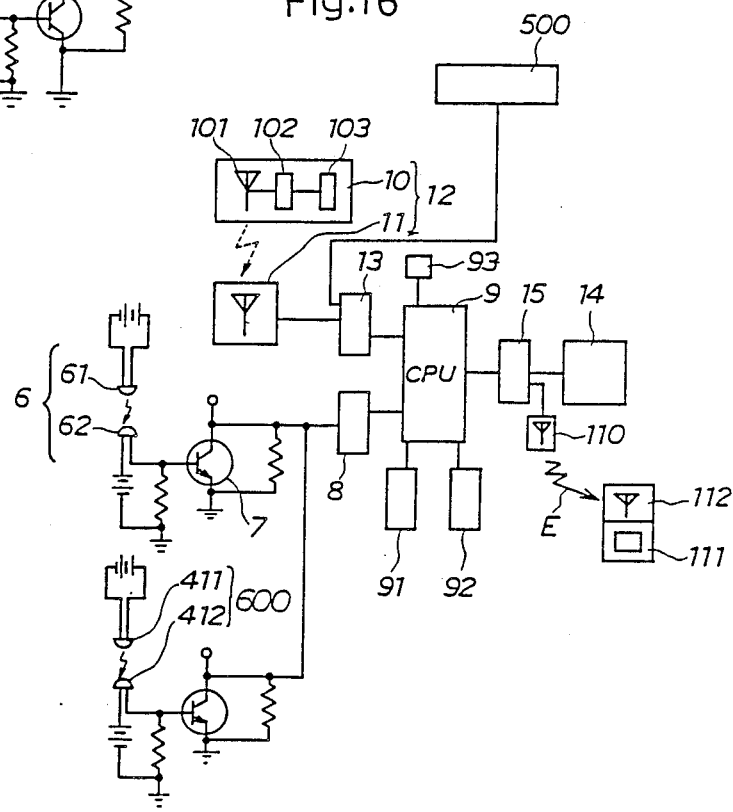

As shown in FIG. 16, a window/door lock mechanism 500 may output a system setting signal to automatically set the system when the car owner stops the engine and pulls out the engine key, or shuts the door and locks it with a door key, or interlocks the door and shut it with the outside door grip turned up to lock the door. Then, the system is set as the car owner takes the above action, hence eliminates the possibility of the owner forgetting to set the system.

In this case, a system switch may be provided where the engine key is inserted, or a limit switch, a proximity switch or a mercury switch provided at or adjacent an interlocked element 100a of the cylinder lock 100 which switch is operable to set the system with rotation of the inner cylinder 2 caused by the door key 200. Alternatively, the system may be set by a proximity switch operable through contact with an operating rod when the car door is interlocked.

Further, in this case, the remote control transmitter 10 is used to turn off the alarm 14 when the car owner opens the car door.

According to the present invention, the car body includes the set lamp 93 for enabling confirmation that the system is set. Thus, the car owner can readily confirm that the car theft proofing system is positively set, which promotes assurance for car theft prevention.

The advantages of the various features of the described system will be listed below.

The theft signal comprising a buzzer or flashing of a lamp realizes a simple construction and positively notifies an abnormality to the car owner or authorized driver.

The use of a car battery as a system power source mounted in the car body simplifies the system and greatly facilitates its provision in the car body.

The use of a car battery as a system power source mounted in the car body, and a reserve battery as a power source for driving other circuits has the advantages that the load is reduced for the car battery, and the alarm operates reliably.

The driving period set for the alarm is effective to avoid a long operation of the alarm thereby reducing noise, and greatly lighten the load for the alarm driving power source.

The remote control transmitter including means to forcibly turn off the alarm avoids a long alarm operation to reduce noise and the load for the alarm driving power source when the car owner has operated the alarm 14 in error or after a thief is caught.

The feature that the remote control transmitter is operable to set the system to an operable state in the car body, enables the car owner to readily set the system from outside the car.

The feature that the system is set when the engine is stopped by an engine key and the engine key is pulled out or the door is locked, assures automatic setting of the system and eliminates the possibility of a trouble occurring as a result of the owner forgetting to set the system.

The set lamp provided for enabling confirmation that the system is set enables the car owner to readily confirm that the car theft proofing system is positively set, which promotes assurance for car theft prevention.

What is claimed is:

1. A car theft proofing system comprising an elongate sensor mounted in a space between a car door and a window pane and upwardly of a door lock mechanism for detecting insertion into the space of a plate, bar or other article, an alarm device for giving an alarm, alarm drive means that produces an output signal for driving the alarm device, control means to cause the alarm device to give the alarm in response to a signal received from the elongate sensor and the signal from the alarm drive means, and a radio transmitter for detecting insertion of the article and transmitting a radio wave, wherein said alarm drive means includes a portable remote control transmitter and a receiver disposed on a car body, said remote control transmitter including an abnormality alarm means for transmitting a theft signal in response to the radio wave transmitted from said radio transmitter.

2. A car theft proofing system as claimed in claim 1, wherein said theft signal comprises a buzzer or flashing of a lamp.

3. A car theft proofing system as claimed in claim 1, wherein a car battery is used as a system power source mounted in the car body.

4. A car theft proofing system as claimed in claim 2, wherein a car battery is used as a system power source mounted in the car body.

5. A car theft proofing system as claimed in claim 1, wherein a car battery is used as a system power source mounted in the car body for driving said alarm device, and a reserve battery is used as a power source mounted in the car body for driving said radio transmitter and related circuits.

6. A car theft proofing system as claimed in claim 2, wherein a car battery is used as a system source mounted in the car body for driving said alarm device, and a reserve battery is used as a power source mounted in the car body for driving said radio transmitter and related circuits.

7. A car theft proofing system as claimed in claim 3, wherein a car battery is used as a system power source mounted in the car body for driving said alarm device, and a reserve battery is used as a power source mounted in the car body for driving said radio transmitter and related circuits.

8. A car theft proofing system as claimed in claim 1, wherein a drive period is set for said alarm.

9. A car theft proofing system as claimed in claim 1, wherein said remote control transmitter includes means to forcibly turn off said alarm.

10. A car theft proofing system as claimed in claim 2, wherein said remote control transmitter includes means to forcibly turn off said alarm.

11. A car theft proofing system as claimed in claim 3, wherein said remote control transmitter includes means to forcibly turn off said alarm.

12. A car theft proofing system as claimed in claim 1, wherein said remote control transmitter is operable to set the system in the car body to an operable state.

13. A car theft proofing system as claimed in claim 2, wherein said remote control transmitter is operable to set the system in the car body to an operable state.

14. A car theft proofing system as claimed in claim 3, wherein said remote control transmitter is operable to set the system in the car body to an operable state.

15. A car theft proofing system as claimed in claim 5, wherein said remote control transmitter is operable to set the system in the car body to an operable state.

16. A car theft proofing system as claimed in claim 1, wherein the system is set when an engine in the body is stopped by an engine key and the engine key is removed or when the door is locked.

17. A car theft proofing system as claimed in claim 2, wherein the system is set when an engine in the body is stopped by an engine key and the engine key is removed or when the door is locked.

18. A car theft proofing system as claimed in claim 3, wherein the system is set when an engine in the body is stopped by an engine key and the engine key is removed or when the door is locked.

19. A car theft proofing system as claimed in claim 5, wherein the system is set when an engine in the body is stopped by an engine key and the engine key is removed or when the door is locked.

20. A car theft proofing system as claimed in claim 9, wherein the system is set when an engine in the body is stopped by an engine key and the engine key is removed or when the door is locked.

21. A car theft proofing system as claimed in claim 1, further comprising a set lamp for enabling confirmation that the system is set.

22. A car theft proofing system as claimed in claim 2, further comprising a set lamp for enabling confirmation that the system is set.

23. A car theft proofing system as claimed in claim 3, further comprising a set lamp for enabling confirmation that the system is set.

24. A car theft proofing system comprising an elongate sensor mounted in a space between a car door and a window pane and upwardly of a door lock mechanism for detecting insertion into the space of a plate, bar or other article, a sensor attached to or mounted adjacent a cylinder door lock for detecting insertion into the door lock of a door key or other article, an alarm device for giving an alarm, alarm drive means that produces an output signal for driving the alarm device, control means to cause the alarm device to give the alarm in response to a signal received from at least one of the sensors and the signal from the alarm drive means, and a radio transmitter for detecting insertion of the article and transmitting a radio wave, wherein said alarm drive means includes a portable remote control transmitter and a receiver disposed on a car body, said remote control transmitter including an abnormality alarm means for transmitting a theft signal in response to the radio wave transmitted from said radio transmitter.

25. A car theft proofing system as claimed in claim 24, wherein a car battery is used as a system power source mounted in the car body.

26. A car theft proofing system as claimed in claim 24, wherein a car battery is used as a system power source mounted in the car body for driving said alarm device, and a reserve battery is used as a power source mounted in the car body for driving said radio transmitter and related circuits.

27. A car theft proofing system as claimed in claim 24, wherein a drive period is set for said alarm.

28. A car theft proofing system as claimed in claim 24, wherein said remote control transmitter includes means to forcibly turn off said alarm.

29. A car theft proofing system as claimed in claim 24, wherein said remote control transmitter is operable to set the system in the car body to an operable state.

30. A car theft proofing system as claimed in claim 24, wherein the system is set when an engine in the body is stopped by an engine key and the engine key is removed or when the door is locked.

31. A car theft proofing system as claimed in claim 24, further comprising a set lamp for enabling confirmation that the system is set.

* * * * *

UNITED STATES PATENT AND TRADEMARK OFFICE
CERTIFICATE OF CORRECTION

PATENT NO. : 4,983,948
DATED : January 8, 1991
INVENTOR(S) : Sadakatsu Sunami

It is certified that error appears in the above-identified patent and that said Letters Patent is hereby corrected as shown below:

TITLE PAGE:
Add the following:

[30]    Foreign Application Priority Data

Nov. 18, 1988 [JP]    Japan...........63-293414

Signed and Sealed this

Twenty-eighth Day of July, 1992

Attest:

DOUGLAS B. COMER

*Attesting Officer*    Acting Commissioner of Patents and Trademarks